US009164737B2

(12) United States Patent
Nathan et al.

(10) Patent No.: US 9,164,737 B2
(45) Date of Patent: Oct. 20, 2015

(54) AUGMENTING PROGRAMMING LANGUAGES WITH A TYPE SYSTEM

(75) Inventors: Adam D. Nathan, Redmond, WA (US); Andrew R. Sterland, Seattle, WA (US); Timothy S. Rice, Bellevue, WA (US); Michael J. Leonard, Lake Stevens, WA (US); John I. Montgomery, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1341 days.

(21) Appl. No.: 12/122,021

(22) Filed: May 16, 2008

(65) Prior Publication Data

US 2009/0288067 A1    Nov. 19, 2009

(51) Int. Cl.
*G06F 9/44*    (2006.01)
*G06F 9/45*    (2006.01)

(52) U.S. Cl.
CPC . *G06F 8/34* (2013.01); *G06F 8/437* (2013.01)

(58) Field of Classification Search
None
See application file for complete search history.

(56) References Cited

U.S. PATENT DOCUMENTS

| | | | | |
|---|---|---|---|---|
| 6,951,014 | B1* | 9/2005 | Sokolov | 717/139 |
| 7,168,063 | B2 | 1/2007 | Meijer | |
| 7,325,007 | B2 | 1/2008 | Castro et al. | |
| 7,340,745 | B2* | 3/2008 | Waldorf | 719/328 |
| 7,464,329 | B2* | 12/2008 | Relyea et al. | 715/234 |
| 7,711,753 | B2* | 5/2010 | Krishnaswamy et al. | 707/802 |
| 7,886,264 | B1* | 2/2011 | Peyton et al. | 717/100 |
| 7,971,194 | B1* | 6/2011 | Gilboa | 717/136 |
| 2004/0083464 | A1* | 4/2004 | Cwalina et al. | 717/141 |
| 2005/0204340 | A1* | 9/2005 | Ruminer et al. | 717/123 |
| 2006/0129599 | A1 | 6/2006 | Hammerich | |
| 2006/0156314 | A1* | 7/2006 | Waldorf | 719/328 |
| 2006/0167981 | A1 | 7/2006 | Bansod et al. | |
| 2007/0038978 | A1 | 2/2007 | Meijer et al. | |
| 2007/0055964 | A1* | 3/2007 | Mirkazemi et al. | 717/140 |
| 2007/0124334 | A1 | 5/2007 | Pepin | |
| 2007/0130205 | A1 | 6/2007 | Dengler et al. | |
| 2007/0168949 | A1* | 7/2007 | Shattuck et al. | 717/115 |
| 2007/0169036 | A1 | 7/2007 | Garner et al. | |

(Continued)

OTHER PUBLICATIONS

Leon, "Javascript—More than Just a Scripting Language", 1999-2004, Insario Corporation, pp. 5.

(Continued)

*Primary Examiner* — Matthew Brophy
(74) *Attorney, Agent, or Firm* — Kevin Sullivan; Aaron Hoff; Micky Minhas

(57) ABSTRACT

Described is a technology by which metadata augments a programming language such as JavaScript. Software components such as application programming interfaces are associated with metadata. When a software component is selected for use, such as when putting together a computer program in a graphical programming environment, its corresponding metadata is accessed. The metadata may be used to validate the usage of the software component, such as to validate a constraint associated with a value, provide a default value, validate a value's type, and/or determine whether a value is required. Validation may also determine whether data output by one software component is of a type that is appropriate for input by another software component. In addition to validation via type metadata, the metadata may provide descriptive information about the selected software component, such as to assist the programmer and/or provide further information to the programming environment.

18 Claims, 4 Drawing Sheets

(56) References Cited

U.S. PATENT DOCUMENTS

2007/0234288 A1 10/2007 Lindsey et al.
2008/0127128 A1* 5/2008 Mateescu et al. ............ 717/139

OTHER PUBLICATIONS

Vinoski, "Scripting JAX-WS", IEEE Internet Computing, vol. 10, No. 3, 2006, pp. 6.

* cited by examiner

AUGMENTING PROGRAMMING LANGUAGES WITH A TYPE SYSTEM

BACKGROUND

Dynamic programming (e.g., scripting) languages are commonly used by programmers to produce code. JavaScript (also referred to as ECMAScript or JScript) is a well-known example of one such programming language widely used on the web, and is valued for its flexibility and simplicity. Much of that flexibility is derived from the fact that JavaScript is dynamically-typed, which means that programmers do not have to declare the types of their variables in their programming. Instead, the JavaScript engine attempts to treat whatever variable the programmer is using as the data type that makes the most sense in the context in which it is being used.

However, despite this flexibility, there are drawbacks to such a dynamically-typed language. For one, some data values are ambiguous; dynamic typing makes it more difficult for programmers and runtimes to differentiate between such ambiguous values, and to do parameter validation and matching. By way of example, the value '98052' may correspond to an integer or a string, as well as possibly corresponding to a higher-level concept like a zip code. In such an example, dynamic typing has no way to determine the value's intended type.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which sets of metadata are associated with programming language code components, such as application programming interfaces, with a corresponding set of metadata accessed when a selected programming language code component is used. The selected set of metadata may be used to validate the usage of the selected programming language code component, e.g., to validate a constraint associated with a value, providing a value with default data, validate a value's type, and/or determine whether a value is required. Validation may also determine whether data output by one component is of a type that is appropriate for input by another component. In addition to validation, the metadata may provide descriptive information about the selected programming language code component.

In one example implementation, programming code is developed via a user interface, such as by dragging representations (icons) of software components onto a design surface; such placement may be detected. For a part of the programming code (e.g., corresponding to the software component), the corresponding set of metadata, which may be XML, is selected and used to ensure that the software component properly executes. For example, when a software component having a defined interface is coupled to another software component, the compatibility of the input and output data may be checked. As another example, descriptive metadata or type system metadata may be used at runtime to ensure proper execution.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using a metadata system (e.g., XML-based) to augment a programming language (e.g., the JavaScript/ECMAScript/JScript language) with an explicit capability and type system that need not rely on inference. As will be understood, the use of such metadata adds significant depth to the basic programming language typing mechanisms. By way of example, with such metadata, programmers, the programming environment and/or the application runtime can determine the data types of data values (e.g., parameters, return types or fields, not necessarily numeric), establish whether a data value is optional or required, provide constraints on data values, and so forth. Further, documentation based upon the metadata may be provided, such as to dynamically assist a programmer when programming.

While many of the examples described herein are directed towards XML-based metadata and the JavaScript/ECMAScript/JScript language, it is understood that these are only examples. Indeed, other metadata formats and languages may benefit from the technology described herein. Further, while the examples are directed towards a graphical user interface programming environment, any way of entering code and/or metadata, including via text with embedded comments, may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
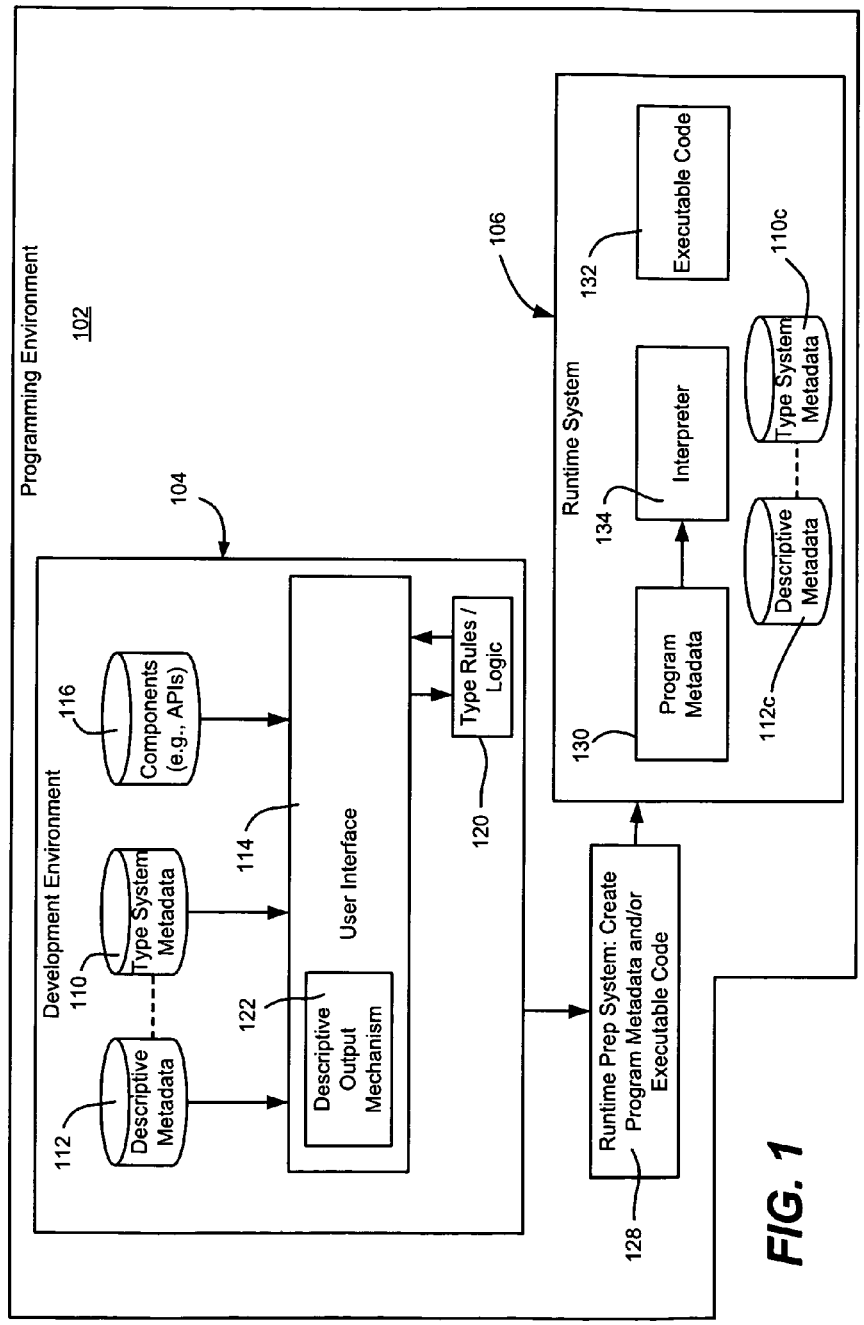
FIG. 1 is a block diagram representing example components in a programming environment for augmenting a programming language with metadata including type system metadata.

Turning to FIG. 1, there is shown a general block diagram representing example components in a programming environment 102 in which metadata is used to augment a programming language. Note that in the example implementation generally represented in FIG. 1, a development environment 104 and a runtime environment 106 are shown in the programming environment 102 as being tightly linked to one another, although this is not necessary, e.g., development may occur separately, such as well before the program is run. In any event, for simplicity, the term "programming environment" is used herein to represent the development environment 104 or the runtime system 106 that executes a running application, however coupled. The development environment 104 or runtime environment 106, or both, may be hosted in a web browser, for example.

In the development environment 104, the exemplified metadata includes type data 110 and descriptive data 112, although as described below the type data 110 and descriptive data 112 may be merged into a single data structure, (e.g., file), as represented in FIG. 1 via the dashed line. In a visual development environment, the programmer has a user interface 114 with which to interact, such as to select a software component (also referred to as a block) from a set of reusable components 116, e.g., interfaces such as APIs, functions and so forth. For example, the components may correspond to classes each containing a collection of interfaces, but a component also may be an individual function or the like. The programmer may interconnect such components, e.g., to link interfaces together. Each component, or individual interfaces, may have an associated set of one or more metadata files.

In general, the type system metadata 110 defines a specific set of types that can be used with each component, such as to enable enhanced type matching relative to the basic type matching provided by the engine (e.g., the JavaScript engine). More particularly, based on the type data, type rules/logic 120 or the like may perform tasks such as to perform parameter validation and matching. For example, the rules/logic 120 may ensure that that output data of one interface is compatible with the input data of another interface to which it is connected, such as to notify the programmer of any mismatch, and/or transparently insert code that converts one output type to an appropriate type for input without the programmer's intervention. Other actions include enforcing constraints (e.g., ensuring a value is within a range, is present when required, is non-zero, is positive, and/or many others), set default values, and so forth.

Also represented in FIG. 1 is the runtime system 106, which takes from a runtime preparation system 128 program metadata 130 and (optionally) executable code 132. Note that the runtime system 106 can operate on executable code, e.g., directly, or operate on program metadata via an interpreter 134; an engine (implicit) runs the interpret or the executable code. The runtime 106 may use the type system metadata 110 and/or the descriptive metadata 112, (or a copy thereof) represented by the labels 112*c* and 110*c*.

Note that although not shown, in one alternative the runtime system 106 may input pre-compiled code and compile it into executable code; the code may be run as it is compiled, e.g., via a just-in-time (JIT) compiler, may be converted to an intermediate language (e.g., NET MSIL) or the executable code may be stored for running at some later time, and so forth. The metadata may be useful across languages, e.g., C+, C## and/or JavaScript.

In addition to improving programming and results based upon associated type metadata, the descriptive metadata 112 may be provided and used. In general, descriptive metadata 112 is used by the programming environment 102 to provide high-level guidance to itself, and to the developer about the kinds of things that the component is capable of doing. For example, descriptive metadata can describe a list of operations that the component offers, a brief description of the code that may be used to automatically generate documentation, or a set of default values that the programming environment will load when the component is called. For example, instead of selecting a component by name, a programmer can possibly search among components by their features, view a tooltip and/or other descriptive output data by hovering over a component to see what the component does, and so forth.

In one example implementation, a standard XML schema defines the descriptive metadata and the type system metadata, as set forth in the example type system metadata below:

| Name | Description |
|---|---|
| title | A short string that describes the object - should not contain HTML |
| url | Any URL that does not fit one of the other URL types |
| color | A hex value color such as #FF0000 |
| imageUrl | A URL pointing to a full sized image |
| feedUrl | A URL pointing to an RSS/ATOM feed |
| description | A description of the object - can contain HTML of any length |
| latitude | A latitude value in decimal format |
| longitude | A longitude value in decimal format |
| thumbnailUrl | A URL pointing to a thumbnail image |
| location | A string that represents an address |
| custom | A custom object that needs to be declared in the manifest file of that block |
| videoUrl | A URL pointing to a video file - should not be a flash video, but rather the actual video that could be played in any viewer |
| ipAddress | An IP address |
| name | The name of something - should be short and not contain HTML |
| firstName | The first (given) name of a person |
| lastName | The last (family) name of a person |
| emailAddress | An email address |
| phoneNumber | A phone number; should include country code |
| city | The name of a city |
| state | The name of a state, US only |
| countryOrRegion | The name of a country or region |
| zipCode | The ZIP code of a location, US only |
| ISBN | An International Standard Book Number (ISBN) |
| UPC | An Universal Product Code (barcode) number |
| stockSymbol | A stock ticker symbol |

Among other aspects, the metadata may be used to augment component functions by providing additional information that can be used by the programming environment and runtime to enforce constraints, set default values, and so on. The following example describes how a JavaScript implementation of a function getGeotaggedPhotos (Table 1) is paired with XML metadata (Table 2). Note how the JavaScript function calls for text and a number, which are described in more depth in the XML (in the input name="text" and input name="number" blocks, respectively).

TABLE 1

(JavaScript Function):

```
TestXClass.prototype.getGeotaggedPhotos = function(text, number, sort)
{
    var apikey = "{{KeyEnc:__ABC }}";
    var params = "&sort=" + (sort || "relevance") + "&text=geotagged+"
+ escape(text);
    var photos = this.__getTestXPhotos("testX.photos.search", number,
params, apikey);
    return photos;
};
```

TABLE 2

(Corresponding XML Metadata):

```
<operation name="getGeotaggedPhotos" callMode="auto">
    <description>Get photos that have a latitude and longitude and
have been tagged as "geotagged".</description>
    <inputs>
        <input name="text" required="true" type="string">
            <description>text in title, description, or
tags</description>
            <defaultValue>beach</defaultValue>
```

TABLE 2-continued (Corresponding XML Metadata):

```
                <constraints />
            </input>
            <input name="number" required="false"
type="nonNegativeInteger">
                <description>maximum number of photos to
                return</description>
                <defaultValue>15</defaultValue>
                <constraints />
            </input>
            <input name="sort" required="false" type="testXSortOrder">
                <description>text in title, description, or
tags</description>
                <defaultValue>relevance</defaultValue>
                <constraints>
                    <constraint mandatory="true" type="oneOf">
                        <value>relevance</value>
                        <value>date-posted-asc</value>
                        <value>date-posted-desc</value>
                        <value>date-taken-asc</value>
                        <value>date-taken-desc</value>
                        <value>interestingness-asc</value>
                        <value>interestingness-desc</value>
                    </constraint>
                </constraints>
            </input>
        </inputs>
        <outputs>
            <output isArray="true" type="custom" object="Photo" />
        </outputs>
    </operation>
```

Table 3 shows an example of the XML metadata for an example service. In the example, some of the example-specific terms in use include:
Class Name: abstraction
Namespace URL: www.somedomain.com
Provider Name: PhotoProvider
Provider URL: www.photoprovider.com In the example, elements such as <providerName>, <keys>, <operations>, <input>, and <constraint> are examples of descriptive metadata. Elements such as latitude, longitude, and date are type metadata.

TABLE 3

(XML metadata for an example service):

```
<abstraction xmlns:xsi="http://www.w3.org/2001/XMLSchema-instance"
xsi:noNamespaceSchemaLocation="http://www.somedomain.com/
schemas/abstractionschema.xsd"
    class="PhotoClass">
    <providerName>PhotoProvider</providerName>
    <providerUrl>http://www.photoprovider.com/</providerUrl>
    <providerLogoUrl>/icons/PhotoproviderLogo.png</providerLogoUrl>
    <abstractionIconUrl>/Photoprovider.png</abstractionIconUrl>
    <suggest output="imagedisplay geodisplay" input="userinput"/>
    <keys>
        <description />
        <signUpUrl>http://www.photoprovider.com/apply/</signUpUrl>
        <key id="APIKey" whenRequired="save">
            <name>API Key</name>
            <notes />
        </key>
    </keys>
    <operations>
        <operation name="getGeotaggedPhotos" callMode="auto">
            <description>Get photos that have a latitude and longitude and
have been tagged as "geotagged".</description>
            <inputs>
                <input name="text" required="true" type="string">
                    <description>text in title, description, or
tags</description>
                    <defaultValue>beach</defaultValue>
                    <constraints />
```

TABLE 3-continued (XML metadata for an example service):

```
                </input>
                <input name="number" required="false"
type="nonNegativeInteger">
                    <description>maximum number of photos to
                    return</description>
                    <defaultValue>15</defaultValue>
                    <constraints />
                </input>
                <input name="sort" required="false"
type="photoproviderSortOrder">
                    <description>text in title, description, or
tags</description>
                    <defaultValue>relevance</defaultValue>
                    <constraints>
                        <constraint mandatory="true" type="oneOf">
                            <value>relevance</value>
                            <value>date-posted-asc</value>
                            <value>date-posted-desc</value>
                            <value>date-taken-asc</value>
                            <value>date-taken-desc</value>
                            <value>interestingness-asc</value>
                            <value>interestingness-desc</value>
                        </constraint>
                    </constraints>
                </input>
            </inputs>
            <outputs>
                <output isArray="true" type="custom" object="Photo" />
            </outputs>
        </operation>
    </operations>
    <objects>
        <object name="Photo">
            <field name="url" type="imageUrl" isArray="false" />
            <field name="thumbnailUrl" type="thumbnailImageUrl"
isArray="false" />
            <field name="originalUrl" type="imageUrl" isArray="false" />
            <field name="linkUrl" type="url" isArray="false" />
            <field name="id" type="numericId" isArray="false" />
            <field name="owner" type="userName" isArray="false" />
            <field name="title" type="title" isArray="false" />
            <field name="longitude" type="longitude" isArray="false" />
            <field name="latitude" type="latitude" isArray="false" />
            <field name="dateTaken" type="date" isArray="false" />
        </object>
    </objects>
</abstraction>
```

Figure 2:
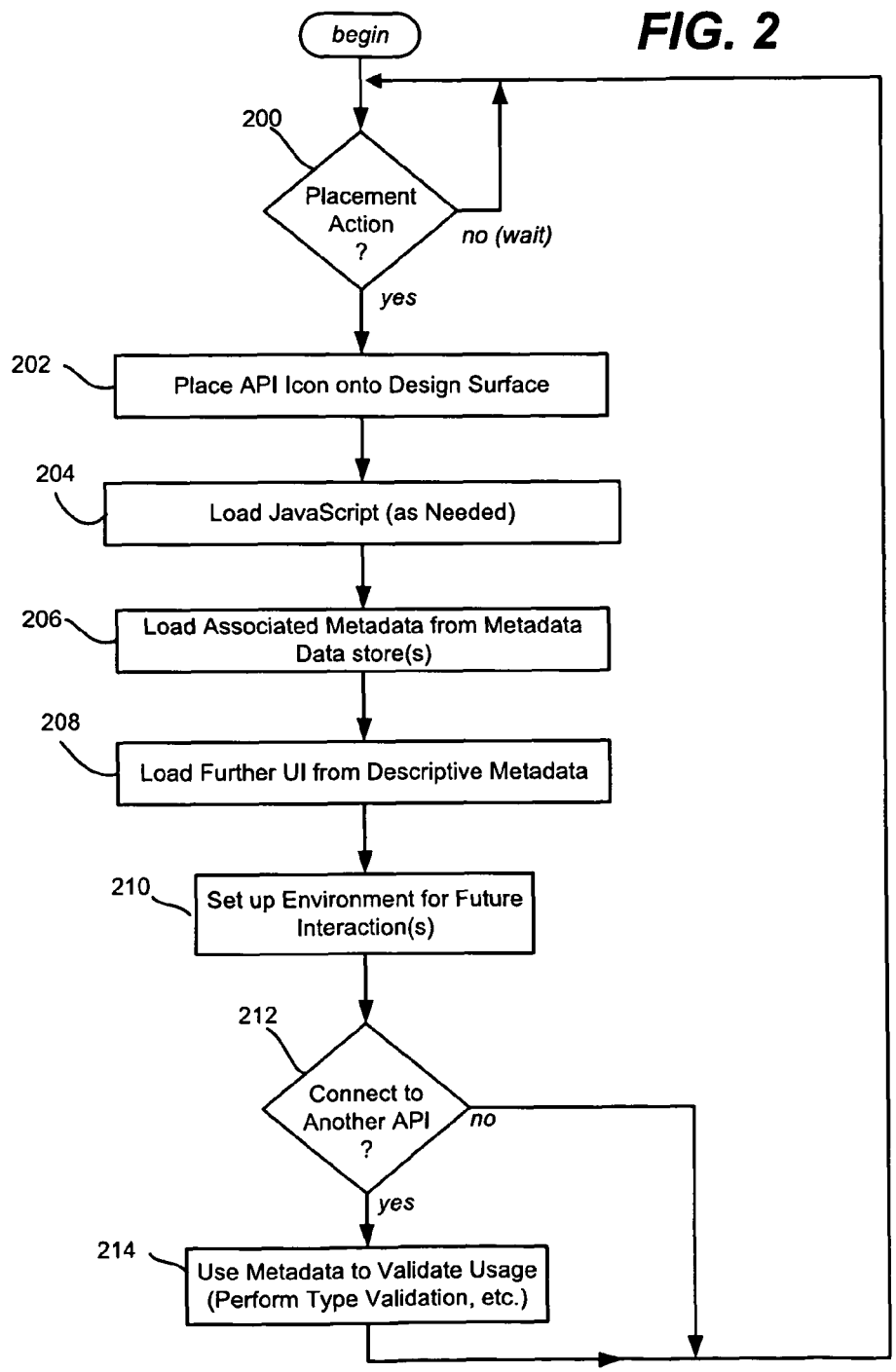
FIG. 2 is a flow diagram showing example steps taken to use type and/or descriptive metadata associated with programming language code.
Figure 3:
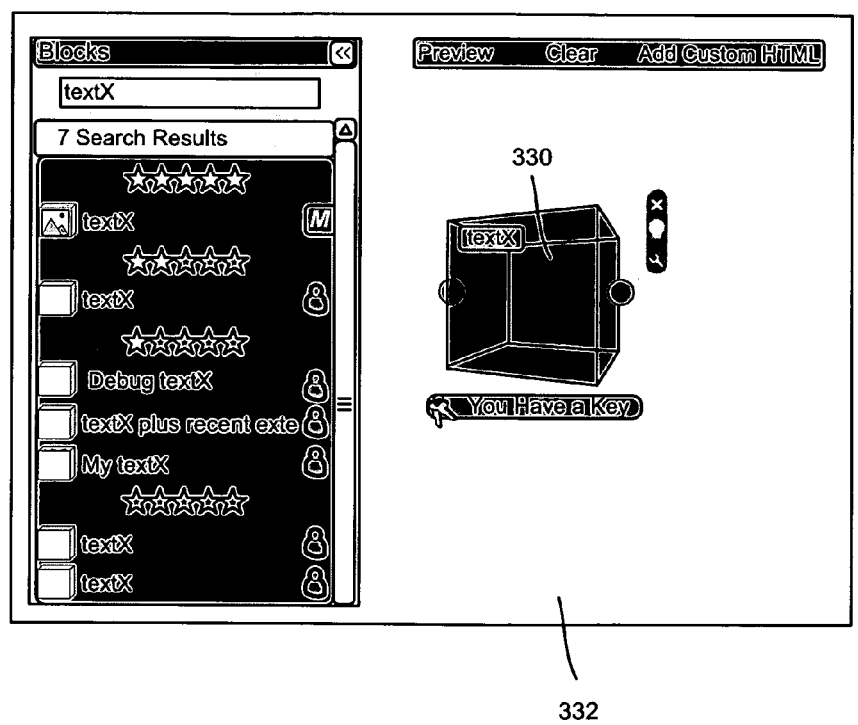
FIG. 3 is a representation of a user interface showing one example usage of augmenting a programming language with type system metadata.

As an example of how such a type system may be used, consider the example of FIGS. 2 and 3, in which a programmer/developer is using a programming environment that uses high-level abstractions to represent API calls. To the programming environment, each API call comprises an interface that calls the underlying implementation, along with some (XML) metadata that provides the programming environment with a additional information, such as the "friendly" name for the API, the methods it supports and the types that those methods expect as input, the return values the API will give, and possibly documentation for the API.

As represented in the example flow diagram of FIG. 2 via steps 200 and 202 and in FIG. 3, the programmer drags an abstract representation (icon) 330 (FIG. 3) of an underlying API onto a design surface 332. Note that other user actions (e.g., remove an icon, exit the programming environment and so on) are not shown in FIG. 2 for purposes of brevity.

In response to placing the icon, as represented by steps 204 and 206, the programming environment 102 loads JavaScript and associated metadata from the data store (or stores) of metadata 110, 112. More particularly, in this example, the action of dragging and dropping the icon 330 onto the programming environment's design surface 332 causes the programming environment 102 to load the API's corresponding XML metadata (as well as the associated JavaScript programming logic), which enables the programming environment 102 to load further UI (step 210, e.g., via the descriptive output mechanism 122) and set up the environment for future interactions between this API and other APIs (step 210).

The API may then be connected to another API, as represented by step 212; note that this typically requires further user interaction, (not explicitly shown). If so, then the programming environment may use the metadata as desired, such as for matching types across APIs, providing documentation, and so forth, as generally represented via step 214.

Thus, in a programming environment that uses a programming language in which different interfaces are interconnected, the metadata provides a flexible, well-understood type system that enables the interfaces to smoothly connect with each other and with the programming environment. For example, the metadata system augments JavaScript so that the programming environment can provide more information to itself, to the programmer, and/or even to end users (e.g., for rich debugging). The metadata system is flexible and extensible, which at the same time, is capable of recognizing specific, pre-set data types.

Exemplary Operating Environment

Figure 4:
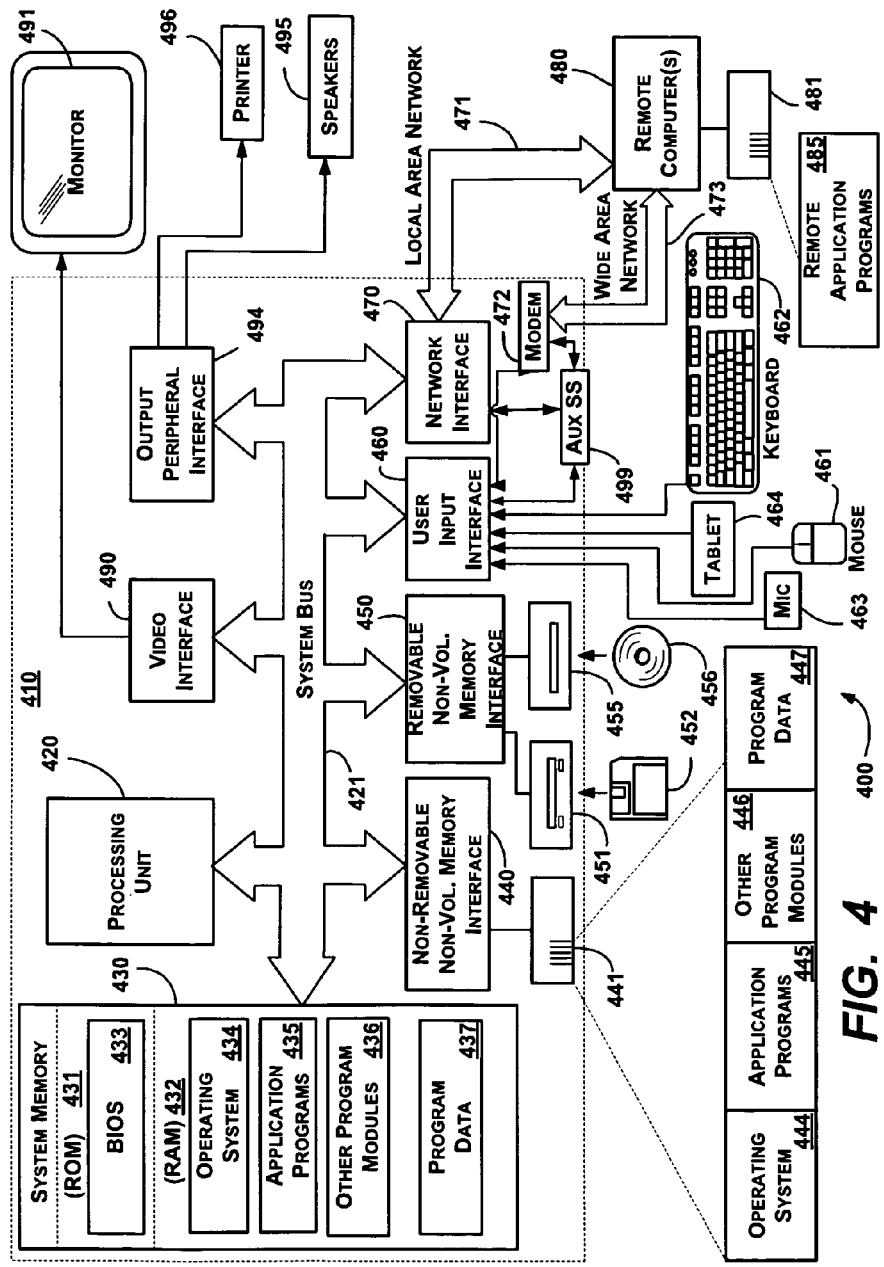
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
providing a set of metadata explicitly identifying a data type for each programming language code component of a plurality of programming language code components, wherein the plurality of programming language code components are written in a dynamically-typed programming language;
detecting placement of a graphical representation of a first programming language code component on a user interface surface in a development environment, the placement graphically connecting the graphical representation of the first programming language code component to at lease one graphical representation of a second programming language component of the plurality of the programming language code components;
in response to the placement, accessing a provided first set of metadata specifying a data type for the first programming language code component and validating the usage of the first programming language code component based on the date type specified by the first set metadata;
and providing the first set of metadata to runtime system for enhanced type matching during execution, including inserting executable code into the first programming language component that converts one data type to an appropriate type for input or output.

2. The method of claim 1 wherein detecting the usage of a first programming language code component comprises providing a graphical user interface for selecting and interacting with the programming language code components.

3. The method of claim 1 wherein accessing the sets of metadata to select a selected set of metadata occurs in response to detecting the placement.

4. The method of claim 1 wherein using the first set of metadata in conjunction with the first programming language code component comprises validating a constraint associated with a value, providing a value with default data, validating a value's type, or determining whether a value is required, or any combination of validating a value's constraint, providing a value with default data, validating a value's type, or determining whether a value is required.

5. The method of claim 1 wherein the first programming language code component is connected to output information for input by another component, and wherein using the first set of metadata comprises determining whether a type of information output by the selected programming language code component is appropriate for input by the other component.

6. The method of claim 1 wherein the first programming language code component is connected to input information output by another component, and wherein using the first set of metadata comprises determining whether a type of information output by the other component is appropriate for input by the first programming language code component.

7. The method of claim 1 wherein using the selected set of metadata comprises providing descriptive information corresponding to the selected programming language code component.

8. In a computing environment, a system comprising: at least one processor; a memory communicatively connect with the at least one processor;
   a plurality of reusable software components programmed in a dynamically-typed programming language;
   design surface by which programming code is developed via placement of icons, the icons comprising graphical representations of the reusable components of the programming code;
   sets of metadata, each set of metadata comprising explicit identification of a data type corresponding to a component of the plurality of reusable components
   a development environment configured to validate usage of a first reusable software component based on a data type indentified in a corresponding first set of metadata, in response to placement of a first icon corresponding to a first reusable software component on the design surface in connection with a second icon representing a second reusable software component
   a runtime system configured to run the programming code and use the first set Of metadata to validate execution of the programming code at runtime by performing enhanced type matching during execution, including insertion executable code into the selected programming language component that converts one data type to an appropriate type for input or output;
   the development environment operative to provide program metadata or executable code, or both program metadata and executable code for the programming code, to the runtime system;
   and the runtime system comprising an interpreter that interprets the program metadata and an engine that runs the interpreter or the executable code.

9. The system of claim 8 wherein the part of the programming code comprises a software component having a defined interface for coupling to at least one other software component.

10. The system of claim 9 wherein the software component is represented as an icon, wherein the programming code is developed in part by placing the icon on a design surface of the user interface, and wherein the first set of metadata is selected upon placing the icon.

11. The system of claim 8 further comprising type rules and logic that validates the part of the programming code based upon type data in the corresponding first set of metadata.

12. The system of claim 8 wherein the first set of metadata comprises at least some data defined according to an extensible markup language (XML) schema.

13. The system of claim 8 wherein the programming code comprises JavaScript, European Computer Manufactures Association (ECMA)Script, or JScript.

14. The system of claim 8 further comprising a descriptive output mechanism that provides descriptive information with respect to the part of the programming code, the descriptive information based upon information maintained in the corresponding selected set of metadata.

15. A computer-readable memory storage device having stored thereon:
   a data structure that comprises at least some data defined according to an extensible markup language (XML) schema, comprising:
      a first set of data that associates the data structure with a software component programmed in a dynamically-typed programming language;
      a second set of data comprising descriptive information with respect to the software component;
      a third set of data comprising an explicit data type identification for the software component; and
   a programming environment configured to:
      provide a design surface comprising icons representing other software components also programmed in a dynamically-typed programming language;
      access the data structure upon selection of an icon representing the software component based on the first set of data and connection of the icon to at least one other icon of the design surface,
      uses the second set of data to provide descriptive information, and validate usage of the software component based on the data type identification in the third set of data to provide a type system for the software component that does not rely upon inference by enforcing at least one constraint setting a default value and validating at least one type corresponding to at least one date value of the software component at runtime during execution of the software component
   and a runtime environment configured to validate execution of the software component at runtime by performing enhanced type matching during execution, including inserting executable code into the selected programming language component that converts one date type to an appropriate type for input or output.

16. The one or more computer-readable memory storage device of claim 15 wherein the second set of data comprises text, or a reference to text, graphical data that may be rendered via a user interface, or a reference to graphical data that may be rendered via a user interface, or any combination of text, a reference to text, graphical data or a reference to graphical data.

17. The computer-readable memory storage device of claim 15 wherein the third set of data comprises type data corresponding to a type of data that the software component inputs, outputs or both inputs and outputs.

18. The one or more computer-readable memory storage device of claim 15 wherein the third set of data comprises at least one of a constraint associated with a value, at least one of default data for a value, at least one of type information for a value, or data that indicates whether a value is required, or any combination of a constraint associated with a value, default data for a value, type system information for a value, or at least one of data that indicates whether a value is required.

* * * * *

UNITED STATES PATENT AND TRADEMARK OFFICE
CERTIFICATE OF CORRECTION

PATENT NO.         : 9,164,737 B2
APPLICATION NO.    : 12/122021
DATED              : October 20, 2015
INVENTOR(S)        : Adam D. Nathan et al.

Page 1 of 1

It is certified that error appears in the above-identified patent and that said Letters Patent is hereby corrected as shown below:

Claims

Column 10, line 33, claim 1, "lease" should read --least--.

Signed and Sealed this
Fifteenth Day of March, 2016

Michelle K. Lee
*Director of the United States Patent and Trademark Office*